US008855795B2

(12) United States Patent
Hsu et al.

(10) Patent No.: US 8,855,795 B2
(45) Date of Patent: Oct. 7, 2014

(54) MULTIPLE OUTPUT AUDIO SYSTEM

(75) Inventors: Kuang-Hui Hsu, Taichung (TW); Pei-Chen Chang, Hsinchu (TW); Chien-Hua Hsu, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 2395 days.

(21) Appl. No.: 11/621,130

(22) Filed: Jan. 9, 2007

(65) Prior Publication Data

US 2008/0165985 A1 Jul. 10, 2008

(51) Int. Cl.

| | |
|---|---|
| ***G06F 17/00*** | (2006.01) |
| ***H04R 5/04*** | (2006.01) |
| ***H04S 3/00*** | (2006.01) |
| ***H04H 60/04*** | (2008.01) |

(52) U.S. Cl.

CPC *H04R 5/04* (2013.01); *H04S 3/008* (2013.01); *H04H 60/04* (2013.01); *H04R 2420/01* (2013.01)

USPC .......... 700/94

(58) Field of Classification Search

USPC .......... 381/77, 80, 81, 94.5, 123; 700/94

See application file for complete search history.

(56) References Cited

U.S. PATENT DOCUMENTS

| | | | | |
|---|---|---|---|---|
| 6,111,613 | A | 8/2000 | Sasano et al. | |
| 6,748,497 | B1 | 6/2004 | Kang et al. | |
| 2002/0184637 | A1 * | 12/2002 | Perlman | 725/87 |
| 2003/0225641 | A1 * | 12/2003 | Gritzmacher et al. | 705/34 |
| 2004/0024478 | A1 * | 2/2004 | Hans et al. | 700/94 |
| 2004/0146034 | A1 | 7/2004 | Chou et al. | |
| 2005/0105626 | A1 * | 5/2005 | Douniwa | 375/240.28 |
| 2007/0076547 | A1 * | 4/2007 | Rahman et al. | 369/47.15 |

FOREIGN PATENT DOCUMENTS

| | | |
|---|---|---|
| WO | WO 2005098826 | 10/2005 |

* cited by examiner

*Primary Examiner* — Andrew C Flanders

(74) *Attorney, Agent, or Firm* — McClure, Qualey & Rodack, LLP

(57) ABSTRACT

The invention provides a multiple audio output system comprising a second input buffer storing a second data stream output from a demodulation unit or a demultiplexing unit, a second processing unit receiving and processing the second data stream to output a third data stream, a data buffer receiving a third data stream from the second processing unit, a multiplexer having input terminals receiving a first audio signal and the third data stream, and an output terminal outputting an output data stream, and a first processing unit receiving and processing the output data stream to output a first output signal to drive a first output device. The second processing unit further comprises a second decoder receiving and decoding the second data stream, and a second post processing unit receiving and processing the decoded second data stream to output a second output signal to drive a second output device.

15 Claims, 6 Drawing Sheets

MULTIPLE OUTPUT AUDIO SYSTEM

BACKGROUND OF THE INVENTION

1. Field of the Invention

The invention relates to an audio output system, and more particularly to a multiple output audio system capable of simultaneously playing or switching between different audio sources.

2. Description of the Related Art

FIG. 1 is a schematic block diagram of a dual program audio apparatus in accordance with U.S. Pat. No. 5,910,996. The System 30 intends to receive multiple sources from its input jacks 32*a* through 32*e*, and output two of the sources by jacks 33*a* and 33*b*. One of the outputs is used as foreground sound which is intended to attract the attention of the listeners, for example, news broadcasting. The other output is used as background sound such as background music which may draw less concentration from the listeners. Dual program amplifier circuit 31 receives as its input signals at input jacks 32*a*-32*e* first and second audio programs from a radio tuner A 34, radio tuner B 35, cassette tape player 36, or a compact disc player 37. In an automotive environment car telephone 38 may also be coupled to an input jack 32*e*.

Dual program amplifier circuit 31 is coupled to audio speaker sets 39 and 40 via output jacks 33*a* and 33*b*, respectively, and comprises switching circuit 41, amplifier A 42 and amplifier B 43. The volume of the audio program output by amplifier A 42 is controlled by volume select circuit 44, while the volume of the audio program output by amplifier B 43 is controlled by volume select circuit 45.

Switching circuit 41 receives and directs the input audio signals via input jacks 32*a*-32*e* to amplifier A 42 or amplifier B 43 to drive the audio speaker sets 39 or 40. Although the dual output devices can be driven by the dual program amplifier circuit 31 is easily implemented, the decoding, demodulation or the demultiplexing operation for the input sources 34-38 are independent. The system 30 uses multiple source processors and directs to different output with a multiplexer. Thus, extensive hardware or software resources are required. A multiple output driving system capable of reducing the hardware or software resource loading and having adaptive processing paths is desirable.

BRIEF SUMMARY OF THE INVENTION

A multiple audio output system comprises a second buffer storing a second data stream output from a demodulation unit or a demultiplexing unit, a second processing unit receiving and processing the second data stream to output a third data stream, a data buffer receiving a third data stream from the second processing unit, a multiplexer having input terminals receiving a first audio signal and the third data stream, and an output terminal outputting an output data stream, and a first processing unit receiving and processing the output data stream to output a first output signal to drive a first output device. The second processing unit further comprises a second decoder receiving and decoding the second data stream, and a second post processing unit receiving and processing the decoded second data to output a second output signal to drive a second output device.

A controlling method for a multiple audio output system is also provided, wherein the multiple audio output system comprises a first processing unit receiving and processing a first signal and a second processing unit. The controlling method comprises stopping the first processing unit, fading out an output signal of the first processing unit, switching the input of the second processing unit from the first signal to a third signal, starting processing the third signal by the first processing unit, and fading in the output signal of the first processing unit.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
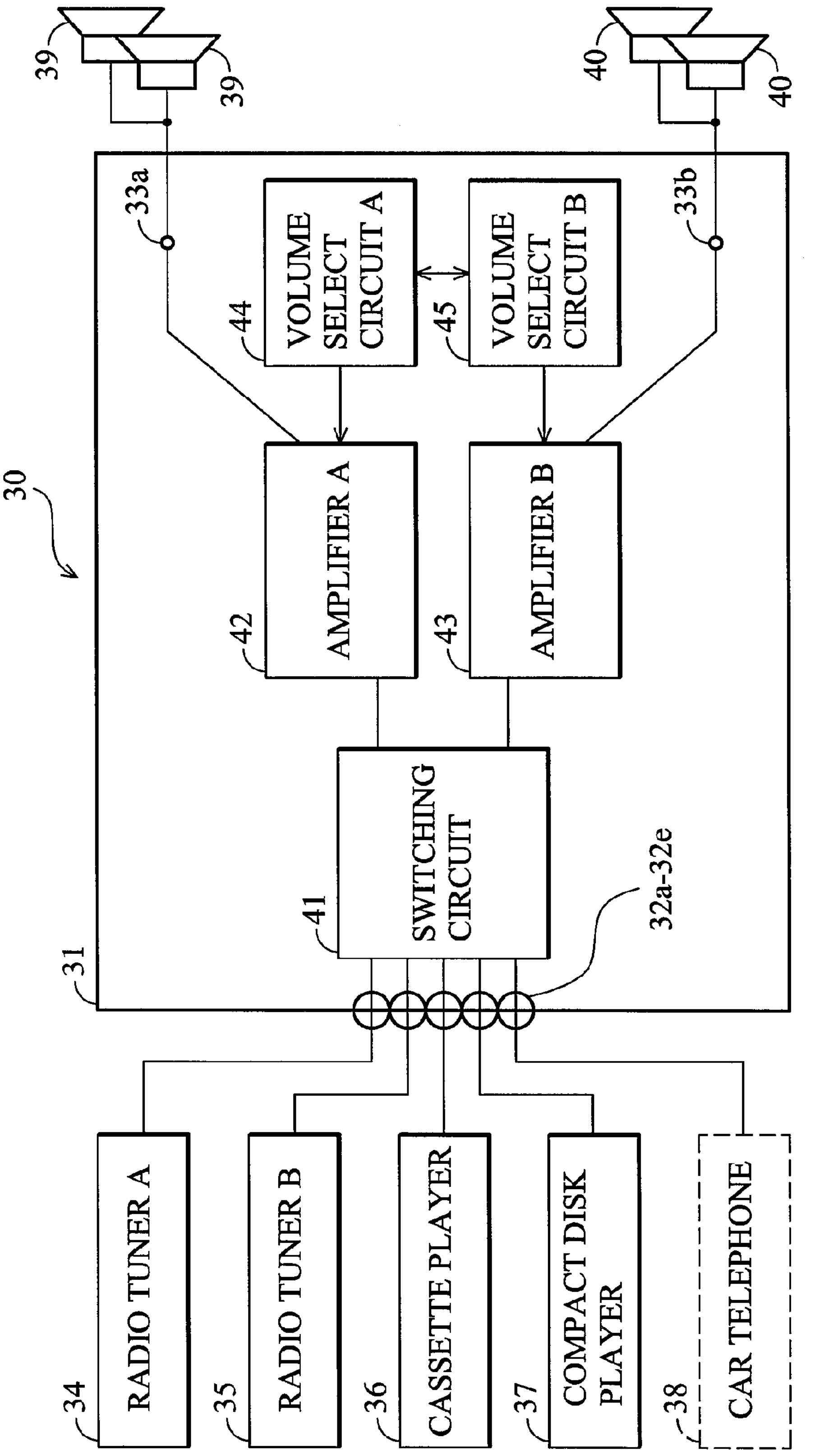
FIG. 1 (RELATED ART)
FIG. 1 is an illustrative schematic block diagram of an illustrative dual program audio apparatus constructed in accordance with U.S. Pat. No. 5,910,996.
Figure 2:
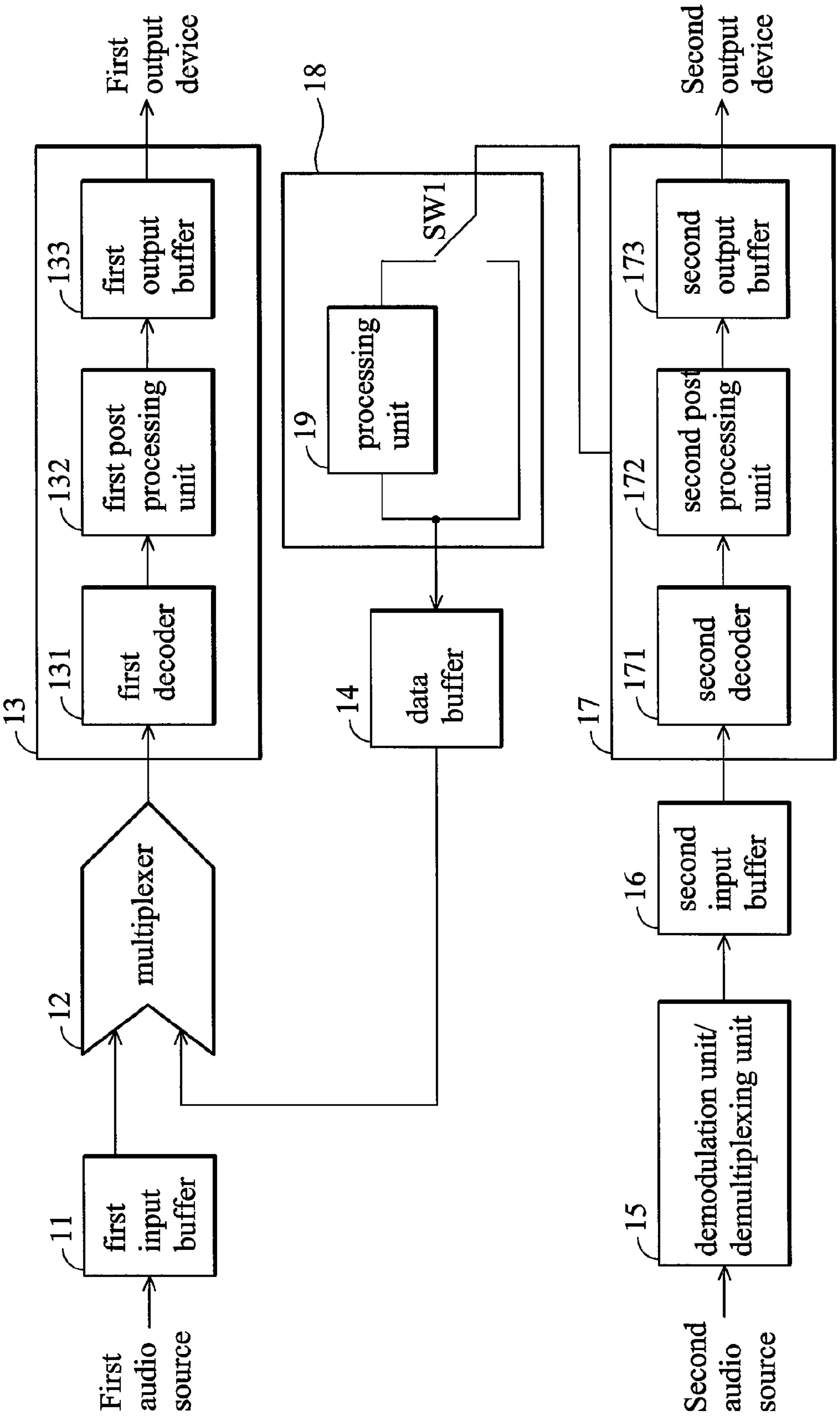
FIG. 2 is a block diagram illustrating an embodiment of a dual output audio system.

FIG. 2 is a block diagram of an embodiment of the dual output audio system. The dual output audio system is a NPTV or DTV system, where the auxiliary output (second output) is always an NPTV/DTV audio signal while the main output (first output) is switchable between line-in or NPTV/DTV audio signal. The dual output audio system comprises a first input buffer 11, a multiplexer 12, a first processing unit 13, a data buffer 14, a demodulation/demultiplexing unit 15, a second input buffer 16, a second processing unit 17 and a selection unit 18. The first input buffer 11 couples the first audio source to the multiplexer 12. Some embodiments of the first audio source comprise a set-top box, a DVD player, or AV receiver. The first audio source provides digital audio data to the first input buffer 11 via a digital interface such as High-Definition Multimedia Interface (HDMI) and Inter-IC Sound ($I^2S$). The multiplexer 12 receives data from the first input buffer 11 and the data buffer 14 and outputs one of the two data streams to the first processing unit 13 in accordance with a control signal (not shown in FIG. 2). The first processing unit 13 receives and processes the data stream from the multiplexer 12 to generate a first audio signal to drive a first output device, such as a speaker or a headphone. In one embodiment, the first processing unit 13 comprises a first decoder 131, a first post processing unit 132 and a first output buffer 133. In another embodiment, the first processing unit 13 comprises only the first post processing unit 132. The first decoder 131 decodes the data stream from the multiplexer 12. The first post processing unit 132 processes the decoded signal, for example, of the first post processing unit 132 conducts the one or more of the following procedures, surrounding effect processing, volume controlling, echo, trim, bass, equalizing, decoding for time shift function, fade-in/fade-out, encryption or decryption, sampling rate conversion, and channel delay.

The first output buffer 133 receives and buffers the first audio signal to drive the first output device.

The demodulation/demultiplexing unit 15 receives a signal from a second audio source. If the second audio source provides an NTSC analog TV audio signal, the demodulation/demultiplexing unit 15 demodulates the analog TV audio signal to the NTSC baseband. If the second audio source provides a digital TV audio signal, the demodulation/demultiplexing unit 15 demultiplexes the digital TV audio signal to acquire audio data corresponding to the selected channel. The second processing unit 17 generate a second audio signal to drive the second output device by receiving audio data from the second input buffer 16. In one embodiment, the second processing unit 17 comprises a second decoder 171, a second post processing unit 172 and a second output buffer 173. The second decoder 171 decodes the audio data from the second input buffer. The second post processing unit 172 processes the decoded signal. This processing unit 172 may be similar to the processing unit 132 which performs audio processing such as surround effect processing, volume controlling, sampling rate conversion, or equalizing. The second output buffer 173 buffers the second audio signal to drive the second output device. The selection unit 18 receives and transmits a third data stream from the second processing unit 17 to the data buffer 14, wherein the third data may be the output of the second decoder 171 or the second post processing unit 172. The data buffer may be a dynamic random access memory (DRAM), static random access memory (SRAM), flash ram, pulse code modulated (PCM) buffer, hard disc or other storage medium. The selection unit 18 has two processing paths controlled by switch SW1, wherein one processing path directly passes through the third data stream to the data buffer 14, and another processing path transmits the third data stream through the processing unit 19 to the data buffer 14. The processing unit 19 can be changed based on the requirement of the first output device or the first processing unit 13. For example, the processing unit 19 can be an encryption unit or an encoder for encrypting or encoding the third data stream. A corresponding decrypting unit or a corresponding decoder is sometimes desirable. Preferably, the corresponding decrypting unit or decoder is coupled between the first decoder 131 and the data buffer 14 when the multiplexer 12 selects the data buffer 14 as data sources.

In one embodiment, the first output device and the second output device are television receiving a TV signal and broadcast the same program, thus, according to the structure of FIG. 2, only the second processing unit need to process the TV signal, and the first processing is a re-producing unit directly transmitting the processed TV signal from the second processing unit to the first output device.

Figure 3:
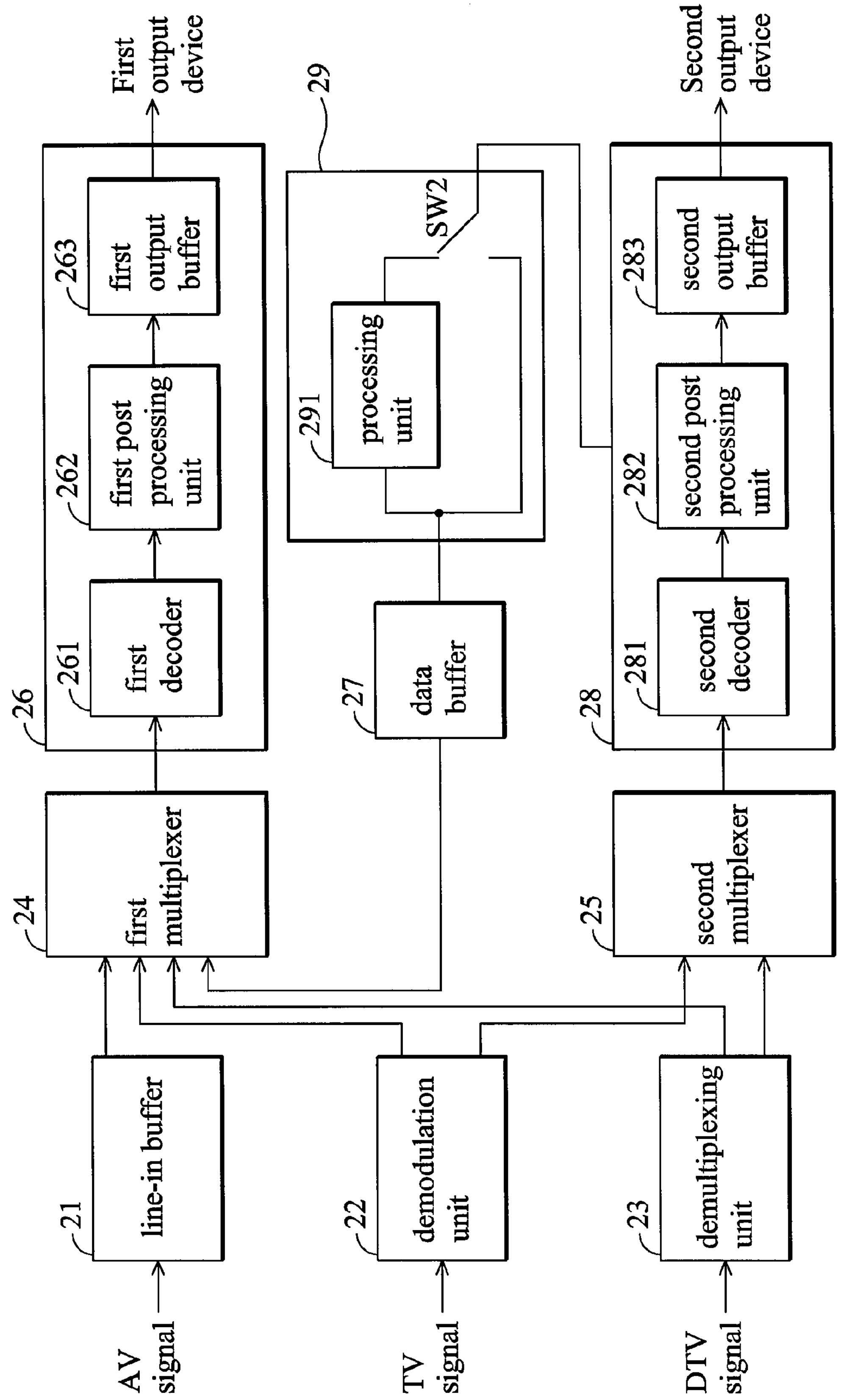
FIG. 3 is a block diagram illustrating another embodiment of the dual output audio system.

FIG. 3 is a block diagram illustrating another embodiment of the dual output audio system. The line-in buffer 21 buffers and transmits audio signal in audio-visual (A/V) source to the first multiplexer 24. The demodulation unit 22 demodulates and transmits audio signal in TV source to the first multiplexer 24 and the second multiplexer 25. The demultiplexing unit 23 demultiplexes and transmits audio signal in digital TV (DTV) source to the first multiplexer 24 and the second multiplexer 25. The second processing unit 28 selects the TV source or the DTV source to process by the second decoder 281. In one embodiment, the second processing unit 28 comprises a second decoder 281, a second post processing unit 282, and a second output buffer 283. The second decoder 281 receives and decodes the data from the second multiplexer 25. The second post processing unit 282 processes the decoded signal from the second decoder 281 by one or more at least one of procedures such as surrounding effect processing, volume controlling, echo, trim, bass, equalizing, time shifting, fade-in/fade-out, channel delay, sampling rate conversion, or any combination of the above. The second output buffer 283 receives and buffers the second audio signal to drive the second output device. The first multiplexer 24 receives signals from the line-in buffer 21, demodulation unit 22, demultiplexing unit 23, and data buffer 27 and directs one of them to the first processing unit 26. In one embodiment, the first processing unit 26 comprises a first decoder 261, a first post processing unit 262 and a first output buffer 263. In another embodiment, the first processing unit 26 comprises only the first post processing unit 262. The first decoder 261 decodes and transmits the data from the first multiplexer 24 to the first post processing unit 262. The first post processing unit 262 processes the decoded signal from the first decoder 261 by one or more at least one of procedures such as, surrounding effect processing, volume controlling, echo, trim, bass, equalizing, time shifting, fade-in/fade-out, and channel delay, sampling rate conversion, or any combination of the above. The first output buffer 263 receives and buffers the first audio signal to drive the first output device.

The selection unit 29 receives and transmits a third data stream from the second processing unit 28 to the data buffer 27, wherein the third data stream may be generated by and output from the second decoder 281 or the second post processing unit 282. The data buffer may be a dynamic random access memory (DRAM), static random access memory (SRAM), flash ram, pulse code modulated buffer (PCM buffer), hard disc or any kind of storage medium. The selection unit 29 having two processing paths controlled by the switch SW1 is similar to the selection unit 18 in FIG. 2, so relevant descriptions are omitted.

By the first multiplexer 24 and the second multiplexer 25, the first output device and the second output device can be driven by the same input source or different input sources. For example, if both the first and second output devices play the TV signal, the first multiplexer 24 and the second multiplexer 25 may respectively direct the signal from the demodulation unit 22 to the first processing unit 26 and the second processing unit 28. In one application, the first output device plays the TV signal by the operating of the data buffer 27 and the second processing unit 28.

In some embodiments, the first output device is a television speaker and the second output device is a DVD recorder, the television can receive a TV signal from the demodulation unit 22 or the data buffer 27. In this case, the TV signal is from the data buffer 27. The data buffer 27 receives a processed TV signal from the second decoder 281 or the second post-processing unit 282 through the selection unit 29. If the audio signals required by the television and DVD recorder are the same, such as a 2 channel audio signal, the data buffer 27 receives a TV signal from the second post-processing unit 282, and the first processing unit can bypass it to the television. In some embodiments, the audio required by the DVD recorder is a 2 channel audio signal and the audio required by the TV is a 5 channel audio signal, the 2 channel audio signal will be converted to 5 channel audio signal by the processing 291 or the first post-processing unit 262 before transmitting to the television. In some embodiments, the output signal of the second processing unit is output via a scart connector.

Figure 4:
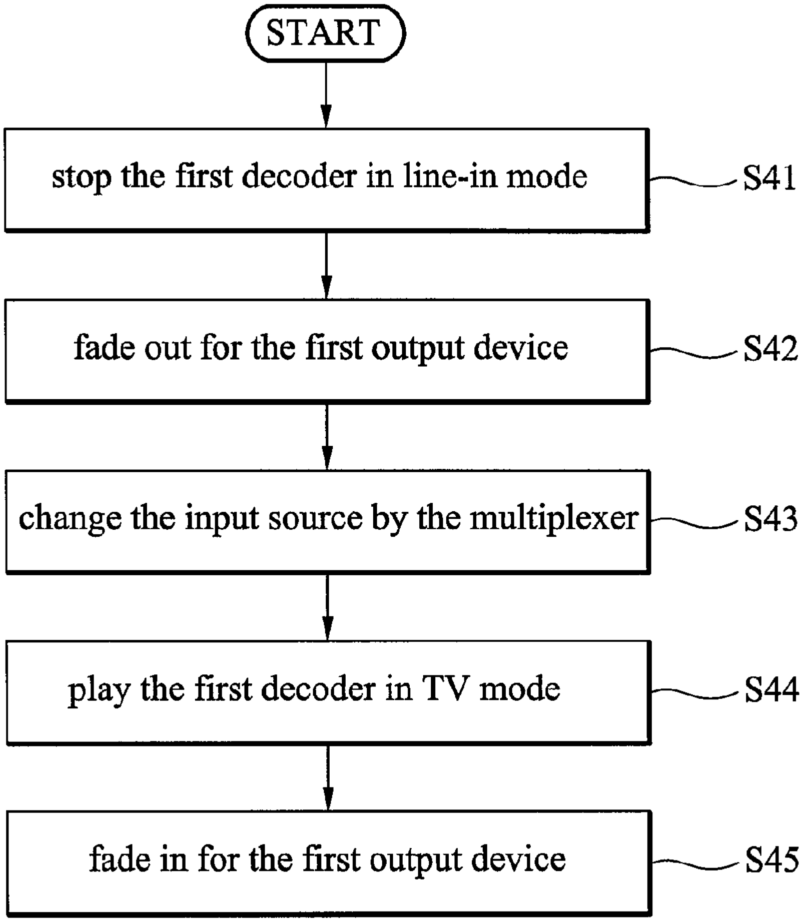
FIG. 4 is a flowchart illustrating one embodiment of the control method of the dual output audio system in FIG. 2.

FIG. 4 is a flowchart showing an exemplary embodiment of the control method, switching line-in mode to TV mode to prevent pop noise, of the dual output audio system in FIG. 2. The first processing unit 13 is first in a line-in mode, i.e. the first processing unit 13 processes a line-in signal, such as an AV signal from the first input buffer 11. The second processing unit 17 processes a TV signal. FIG. 4 shows switching the first processing unit 13 from the line-in mode to a TV mode. In step S41, the first decoder 131 stops and the output signal of the first processing unit 13 is faded out (step S42). In step S43, the first processing unit 13 changes the input source by switching the output of the multiplexer 12 from the AV signal to a TV signal. In this case, the multiplexer 12 directs the signal from the data buffer 14 to the first processing unit 13. In step S44, the first decoder 131 plays in the TV mode, and the output signal of the first processing unit 13 is faded in (step S45).

Figure 5:
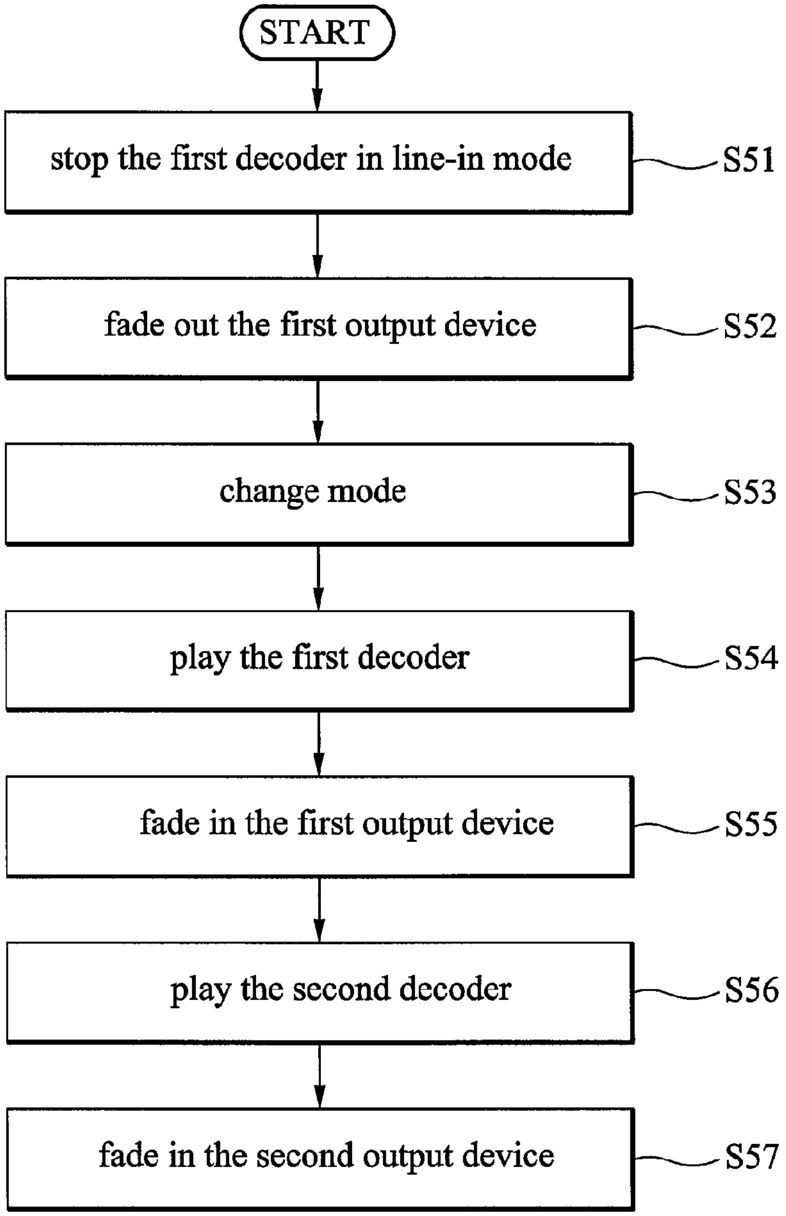
FIG. 5 is a flowchart illustrating one embodiment of the control method of the dual output audio system in FIG. 3.

FIG. 5 is a flowchart showing an embodiment of the control method of the dual output audio system in FIG. 3. The operation illustrated in FIG. 5 is a mode switching operation for the first output device changing from a line-in mode to DTV mode. The second processing unit 28 initially processes the DTV signal and provides a third data stream to the first processing unit 26 via the data buffer 27 and the selection unit 29. Assuming the first processing unit 26 is initially processing the AV source (line-in mode), the first output device is a television, and the second output device is a DVD recorder which initially records the DTV program. When the television changes its audio source from the AV signal to the DTV signal, a mode switching procedure is executed as show in FIG. 5. In steps S51 and S52, the first decoder 261 stops processing the AV signal and the output signal of the first processing unit 26 is faded out. In step S53, the first multiplexer directs the audio signal from the data buffer 27 to the first processing unit 26, thus, the television changes from the line-in mode to the DTV mode. In steps S54 and S55, the first processing unit 26 is played and faded in, and first output device is changed to DTV mode. In the embodiment, the third data stream comprises decoded DTV signals which can be directly broadcasts by the television, so the first decoder does not need to decode the DTV signal and the software resource can be reduced. Furthermore, in the embodiment, the first processing unit 26 does not comprise the first decoder 261 when the first output device and the second output device process the same audio signal.

Figure 6:
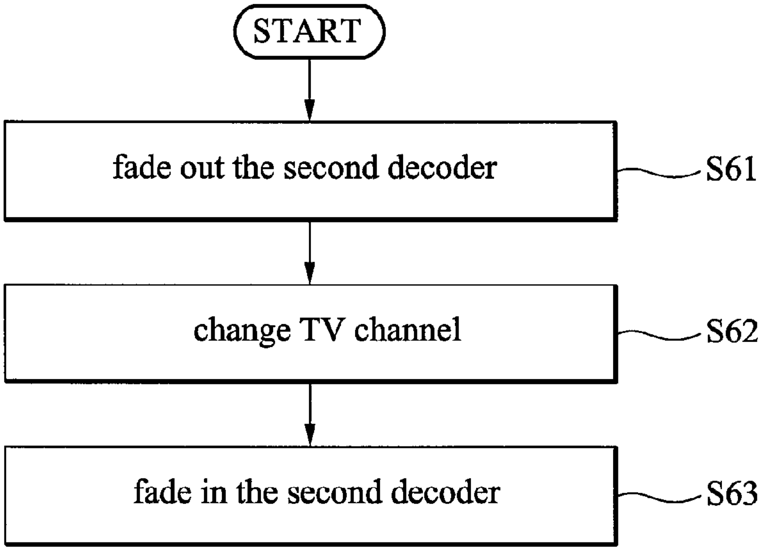
FIG. 6 is a flowchart showing TV channel switching for the dual audio output system in FIG. 2.

FIG. 6 is a flowchart showing TV channel switching for the dual audio output system in FIG. 2. In this embodiment, the main processing unit is the second processing unit 17 and the first processing unit 13 is re-producing unit for directly transmitting the audio data from the second processing unit 17 to the first output device. When the second output device, a television, changes TV channel, a channel switching procedure is executed as shown in FIG. 6. In step S61, the second decoder171 fades out and the demodulation unit/demultiplexing unit 15 then strikes another frequency for changing TV channel in step S62. After switching TV channel, the second decoder 171 fades in (Step S63). In this embodiment, the first output device operates based on the output signal from the second processing unit 17, in other words, when the second decoder 171 fades out, the first output devices fades out, and when the second decoder 171 fades in, the first output device fades in. In the embodiment, the first output device is a DVD recorder for recording the TV program showing on the television, the first output device, and when the television changes TV channel, the TV program recorded by the DVD recorder also changes.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multiple output audio system, comprising:

a second input buffer buffering a second data stream;

a second processing unit processing the second data stream received from the second input buffer, outputting a third data stream and a second output signal, wherein the second processing unit comprises:

a second decoder receiving and decoding the second data stream; and a second post-processing unit receiving and processing the decoded second data stream to output the second output signal to drive a second output device;

a data buffer receiving the third data stream from the second processing unit;

a multiplexer having input terminals receiving a first audio signal and the third data stream from the data buffer, and an output terminal outputting an output data stream, wherein the output data stream is one of the first audio signal and the third data stream; and a first processing unit coupled to the output terminal of the multiplexer, receiving and processing the output data stream to output a first output signal to drive a first output device.

2. The system as claimed in claim 1, the first processing unit further comprising:

a first decoder receiving and decoding the output data stream; and a first post-processing unit receiving and processing the decoded output data stream to output the first output signal.

3. The system as claimed in claim 2, wherein the first post-processing unit performs a surrounding effect processing, volume control, echo processing, trim, bass management, equalization, time shifting, fade-in/fade-out, or channel delay task.

4. The system as claimed in claim 1, further comprising a processing unit coupled between the second processing unit and the data buffer for processing the third data stream.

5. The system as claimed in claim 4, the processing unit is an encoder.

6. The system as claimed in claim 5, further comprising a decoder coupled between the data buffer and the multiplexer.

7. The system as claimed in claim 4, the processing unit is an encrypting unit.

8. The system as claimed in claim 1, further comprising a first input buffer for buffering the first audio signal.

9. The system as claimed in claim 1, further comprising a sampling unit for digitizing an analog TV audio signal into the second data stream.

10. The system as claimed in claim 1, further comprising a demultiplexing unit for demultiplexing a digital TV audio signal to generate the second data stream.

11. The system as claimed in claim 1, wherein the data buffer comprises a dynamic random access memory (DRAM), static random access memory (SRAM), a PCM data buffer, or a hard disk.

12. The system as claimed in claim 1, wherein the second post processing unit processes a surrounding effect processing, volume control, echo processing, trim, bass management, equalizer, time shift, or delay task.

13. The system as claimed in claim 1, wherein the third data stream is generated by the second decoder or the second post processing unit.

14. The system as claimed in claim 1, wherein the first processing unit comprises a first output buffer buffering the first output signal.

15. The system as claimed in claim 1, wherein the second processing unit comprises a second output buffer buffering the second output signal.

* * * * *